April 14, 1931.  V. J. CHAPMAN  1,801,140
WELDING MACHINE
Filed Aug. 1, 1927   3 Sheets-Sheet 1

Inventor:
Verni J. Chapman,
by Alexander S. Lunt
His Attorney.

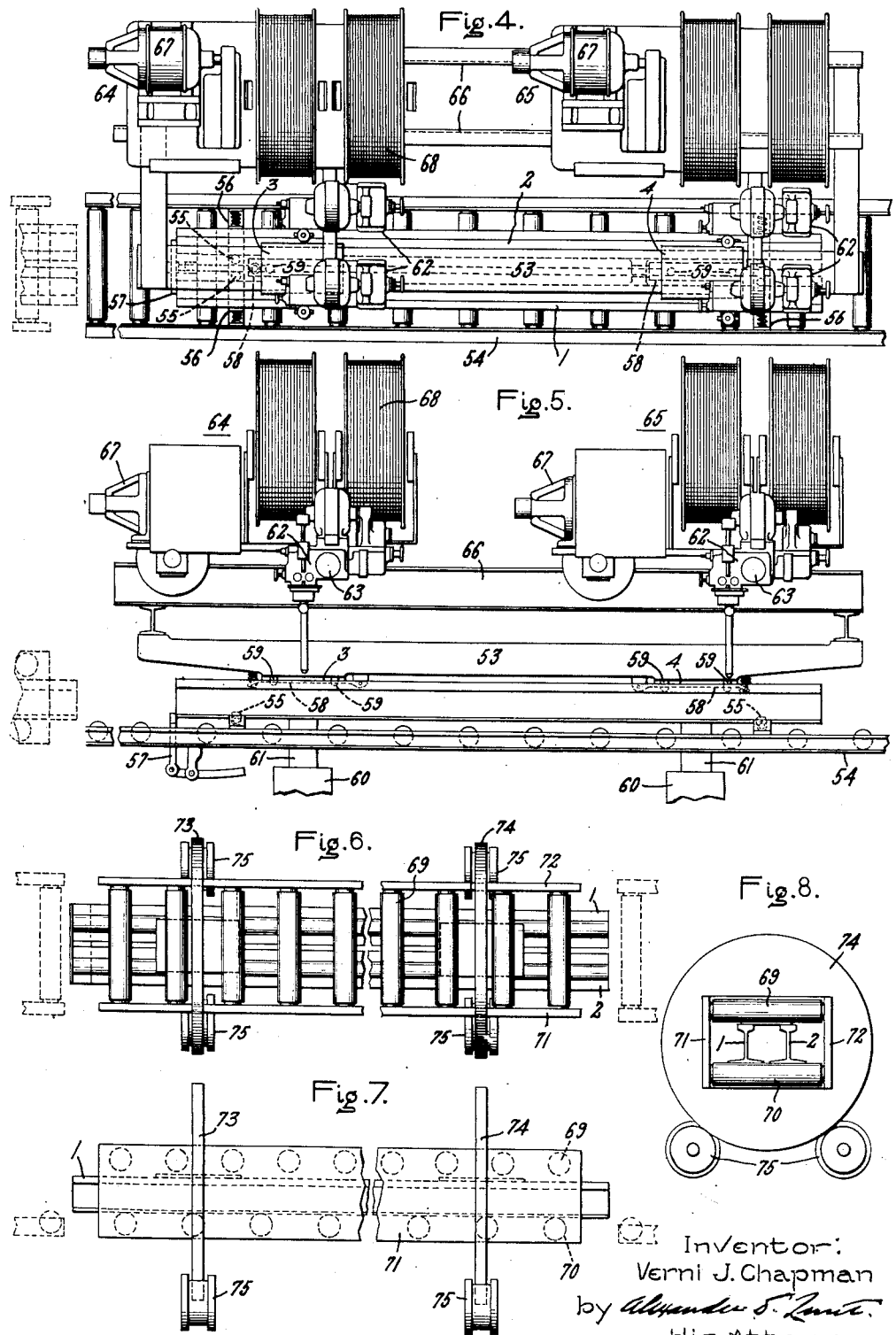

April 14, 1931.  V. J. CHAPMAN  1,801,140
WELDING MACHINE
Filed Aug. 1, 1927  3 Sheets-Sheet 3

Inventor:
Verni J. Chapman
by *Alexander S. Lunt*
His Attorney

Patented Apr. 14, 1931

1,801,140

UNITED STATES PATENT OFFICE

VERNI J. CHAPMAN, OF SCHENECTADY, NEW YORK, ASSIGNOR TO GENERAL ELECTRIC COMPANY, A CORPORATION OF NEW YORK

WELDING MACHINE

Application filed August 1, 1927. Serial No. 209,706.

My invention relates to improvements in welding apparatus.

Apparatus according to the present invention is adapted for the welding together of fabricated structures such as the welding together of the component parts of metallic railroad ties.

More particularly, my invention relates to improvements in electric arc welding apparatus in which automatic means are provided for feeding a welding electrode to the welding arc and in which means are provided for regulating the rate of feed of the electrode automatically to maintain the welding arc at substantially constant length.

An object of my invention is to provide an improved machine in which the work parts are accurately clamped in adjusted relationship previous to the welding operation.
A further object of my invention is to provide means in such a machine for tilting the assembled work parts relative to the welding means to bring the parts in proper position for the welding operation or for inverting the work parts to bring them in proper position for a subsequent welding operation.

My invention will be better understood from the following description taken in connection with the accompanying drawings, and its scope will be pointed out in the appended claims.

Figure 1:
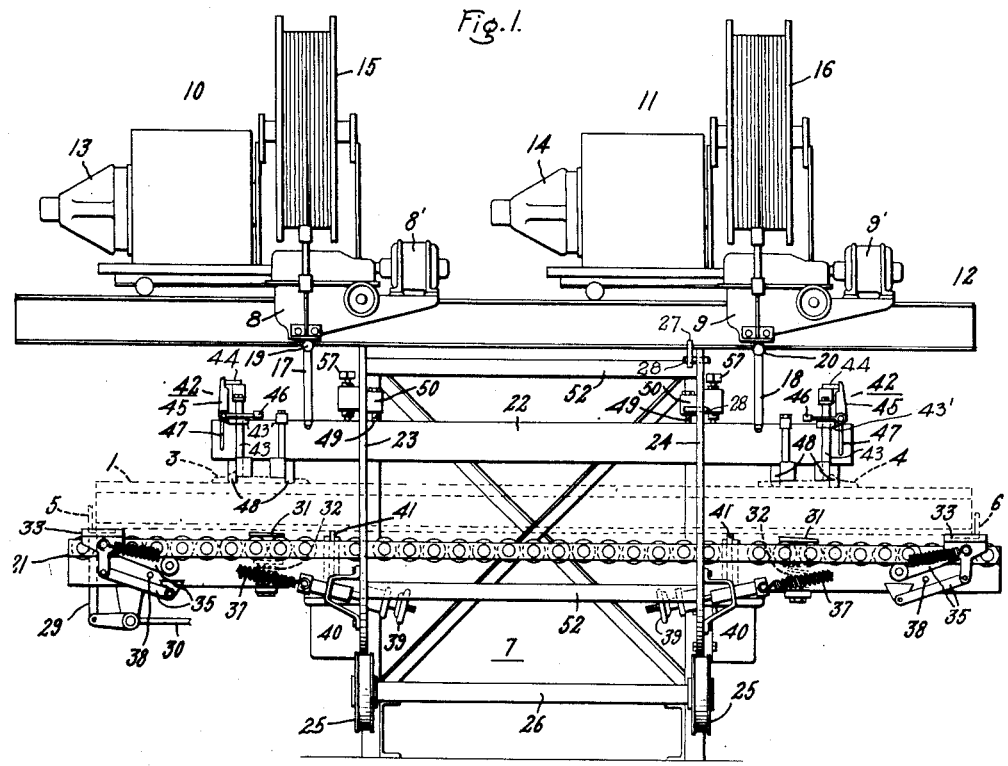
Figure 2:
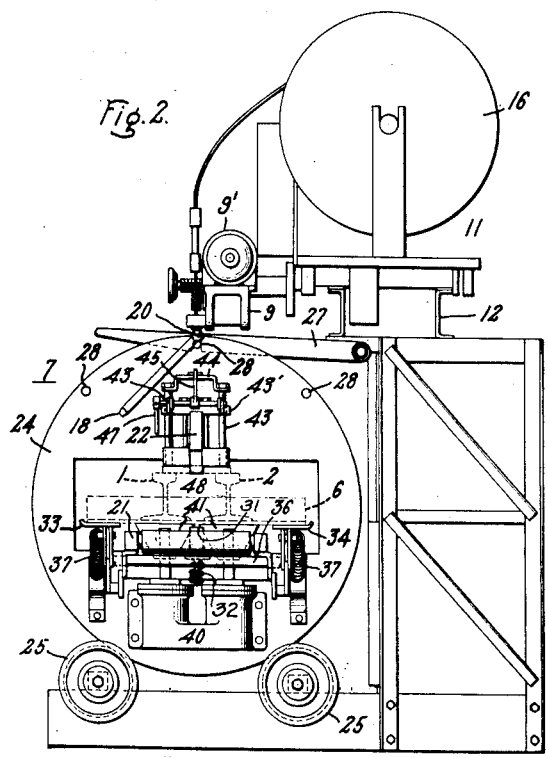
Figure 3:
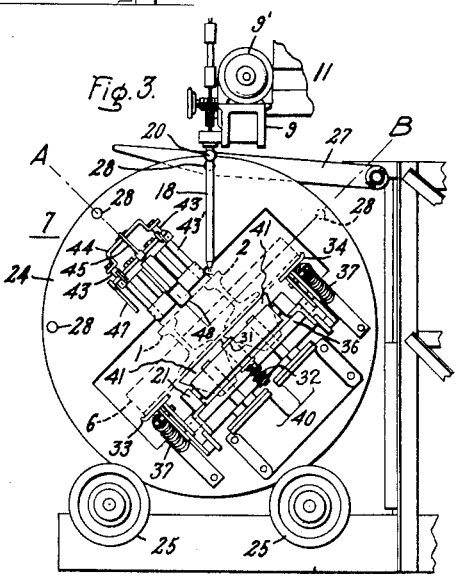
Figure 9:
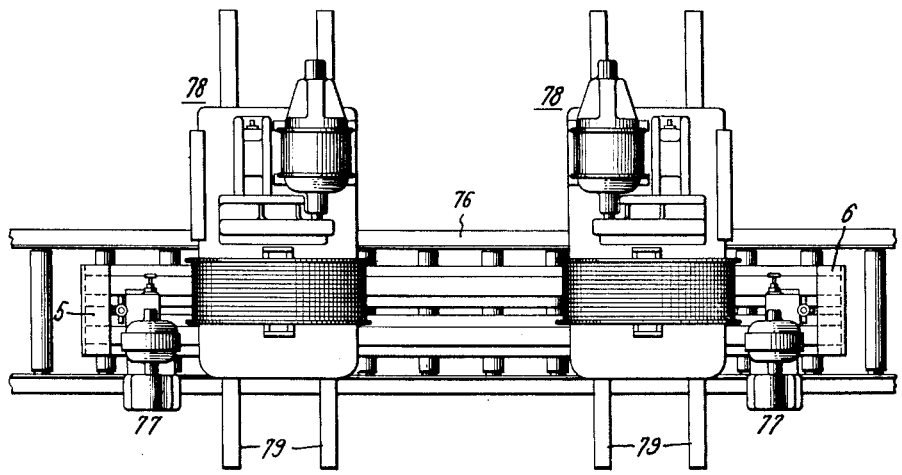
Figure 10:
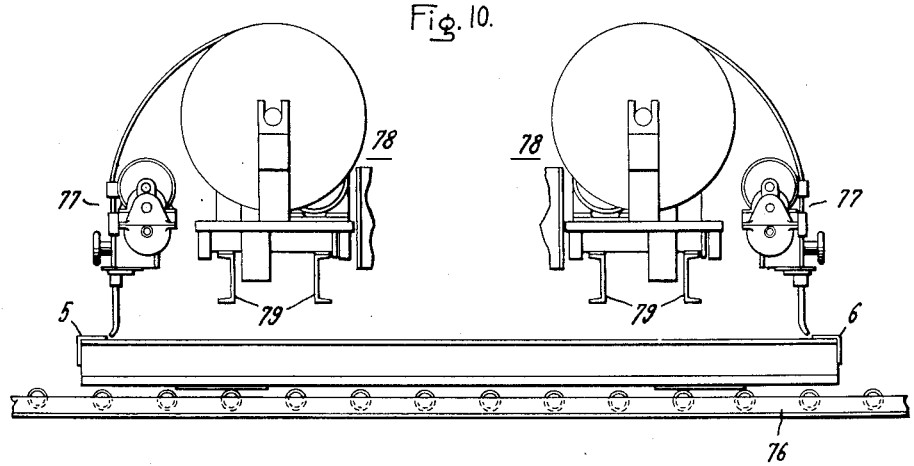

In the drawings, Fig. 1 represents a side view of a preferred embodiment of my invention. Fig. 2 is an end view of the machine shown in Fig. 1, and Fig. 3 shows an end view of this machine with the parts in the position that they occupy when the machine is performing a welding operation. Figs. 4 to 10 inclusive show another embodiment of my invention. Figs. 4 and 9 show plan views and Figs. 5 and 10 show side views of two parts of a welding machine adapted to perform the welding operation, and Figs. 6, 7 and 8 show plan, side and end views of a means for inverting the work or turning the work over after it leaves the part of the machine shown in Figs. 4 and 5 to bring the parts in the correct position for the welding operation that is performed in the part of the machine shown in Figs. 9 and 10.

In certain fabricated structures it is necessary accurately to locate the component parts of the structure previous to welding these parts together so that the finished article will be serviceable for the purpose of its manufacture. For example, in fabricating metal railroad ties, it is necessary that the tie plates to which the rails are to be affixed be held in the same plane and accurately spaced relative to each other so that when the finished ties are placed in the track and the rails fastened to the tie plates that the rails will come accurately to gage. The machines illustrated in the accompanying drawings are particularly adapted for accurately locating the tie plates of fabricated steel ties, although it is of course apparent that the machines are not limited in their application to this particular article of manufacture, for, as will become apparent from the following description, the machines are suitable for welding other fabricated structures.

In Figs. 1, 2 and 3 of the drawings the work has been illustrated in dotted lines in order to prevent it from being confused with the parts of the machine. As illustrated, the work comprises a railroad tie formed of two sections of used rail 1 and 2, two tie plates 3 and 4, and two angles 5 and 6. The machine shown in Figs. 1, 2 and 3 is adapted for accurately locating and automatically welding the tie plates 3 and 4 to the heads of the rail sections 1 and 2. At the same time clamping means are provided for locating the angles 5 and 6 against the ends and bases of the rail sections 1 and 2 so that they may be united with the rails 1 and 2 by means of hand welding. It is, of course, apparent that the machine is not limited in its application to the welding of ties formed of the parts illustrated, since the rail sections 1 and 2, for example, may be replaced by structural forms of different shapes, such as I sections. Furthermore, the angles 5 and 6 may be replaced by cross pieces of different shape and in place of the tie plates 3 and 4 other tie plates may be used. The nature of the tie plates will, of course, depend upon the type of fastening used for securing the rails to the ties.

In the machine illustrated in Figs. 1, 2 and 3 the work is clamped in a work holder generally indicated at 7 and the automatic welding operation is performed through the agency of welding heads 8 and 9 mounted on carriages *10* and *11*. The welding heads are moved relative to the work by these carriages which are self-propelled along a track 12 by traversing motors 13 and 14. The weld rod is fed from reels 15 and 16 carried by the carriages *10* and *11* by the welding heads 8 and 9 to the work through extension nozzles 17 and 18. Any suitable type of mechanism for automatically feeding the electrode so as to maintain the arc length substantially constant during welding may be used. Examples of such machines are now well known. In the arrangement illustrated the electrode drawn from the reel is fed by suitable mechanism operated by the electrode feed motors 8′ and 9′ respectively. The extension nozzles may be pivoted at 19 and 20 to the welding heads 8 and 9 so that they may be swung up out of the way of the work holder 7 when the holder is in the position shown in Figs. 1 and 2. During the welding operation these nozzles occupy the position shown in Fig. 3. Welding current is led into the weld rod preferably through the extension nozzles and the return circuit completed through the work and work holder.

The work holder 7 comprises a roller conveyor 21 and a work holding or supporting member 22 both of which are located in curved or circular members 23 and 24 which are mounted on idler rolls 25. These idler rolls are supported on axles 26 attached to and forming a part of the welding machine. Suitable means, such as flanges, on one set or both sets of idler rolls are provided to prevent the circular members from slipping off the idler rolls. By this arrangement the work is supported in a cradle member provided with rocker means so that it may be rocked or tilted relative to the welding heads. The work may be held in any given position by suitable means such as the latch 27 and pins 28.

At the left-hand end of the conveyor 21, as viewed in Fig. 1, there is a stop 29 which is used to position the rail sections 1 and 2 along the length of the conveyor in correct relative position to the supporting member 22. This stop may be moved to and from its operative position by a hand lever 30.

The rail sections are spaced relative to each other by stops 31. These stops are located on the conveyor below the points where the tie plates 3 and 4 are to be secured to the rail sections 1 and 2. These stops are normally spring pressed to an operative position by springs 32. The upper face of these stops is beveled so that when the finished tie is removed from the machine the cross members on angles 5 and 6 welded to the bottom of the rail sections will not catch on them and render the operation of removing the tie difficult and troublesome.

At each end of the conveyor there is a clamp for holding the angles 5 and 6 against the ends of the rail sections 1 and 2 in the desired position for welding. The clamp illustrated in the drawing comprises two tray members 33 and 34 supported by parallel links 35 pivoted to the conveyor frame. These trays are caused to move in unison by reason of a bar 36 that extends through the frame of the conveyor and connects the upper links with each other in a positive manner. The trays are held in their clamping or retarded position by springs 37 so located off center that there is a usual tendency for the parts to remain in either position. Stops 38 are provided for limiting the movement of the trays. The tension of the springs may be adjusted by hand wheels 39.

In order to force the rails against the tie plates 3 and 4 and member 22, I provide suitable pressure exerting means 40. In order to compensate for the possible difference in size of the rail sections 1 and 2 and to insure that the parts 1 and 2 are forced tightly against the tie plates 3 and 4, I provide independent means for forcing each rail against the tie plate. In the arrangement I have illustrated the pressure exerting means are indicated as fluid pressure devices which act against the rails through webb members 41. While I have shown fluid pressure devices, and shall hereinafter refer to the devices as fluid pressure devices, it will be understood that my invention extends to the use of any device for performing the desired function whether such device be a fluid pressure device, an electromagnetically operated device, or a mechanical clamping device.

Previous to the welding operation the plates 3 and 4 are placed upon the previously located work parts 1 and 2 and adjusted in the desired position by adjusting means generally indicated at *42* on the ends of the beam or supporting member 22 against which the work parts are clamped by the fluid devices 40. The adjusting means comprises a plurality of rods, 43, attached to one another at their ends by a bent bar 44 and loosely supported by a holder 43′ that is clamped to the member 22 so that the lower ends of the rods may extend downward a greater or less extent until they encounter the work parts 3 and 4. A latch 45 is provided for holding the rods in the restricted position they assume when the work is clamped against the supporting member 22. This latch is biased to its operating position by a weight 46. A handle 47 is provided for operating the latch. The adjusting means as a whole may be clamped in any desired position along the length of member 22.

Likewise adjustably clamped to each end of the member 22 are a plurality of dowel pins 48. These dowel pins and the adjusting means 42 associated with one of the pins at each end of the member 22 are so related to each other that after the plates 3 and 4 have been adjusted by the adjusting means 42, the dowel pins 48 will match with openings in the plates and enter these openings when the work is clamped against the supporting member 22. In this way the work parts are accurately clamped in adjusted relation previous to the welding operation.

The supporting member 22 is held in the work holder 7 by bolts 49 which pass through lugs 50, attached to the circular members 23 and 24, into the member 22. The supporting member 22 may have its position adjusted relative to the conveyor 21 by means of these bolts and thrust screws 57, likewise attached to the circular members 23 and 24. The circular members 23 and 24 are braced against one another by pipes 52 which in conjunction with the conveyor 21 and supporting member 22 give rigidity to the work holder.

The operation of the machine is as follows: The rail sections 1 and 2, previously cut to the desired length, are rolled along a conveyor, not shown, but located to the right of the machine, and introduced into the work holder 7 on the conveyor 21 where they are located along the length of the conveyor by the stop member 29 and relative to each other by spacing members 31. The plates 3 and 4 are then placed on the rail sections 1 and 2 and located relative to each other along the rail sections by the adjusting means 42. The rods 43 of this adjusting means are allowed to drop to their lower position by releasing the latch 45 which through the bent rod 44 holds them in the retracted position they assumed when the previous tie was being welded. The arrangement may be such that the rods 43 drop into engagement with the rail sections and that the plates 3 and 4 are brought up against them or that they drop into engagement with the parts 3 and 4 and engage a projecting part or parts of these plates. After the parts 3 and 4 have been correctly located the fluid devices 40 are operated and the parts 1, 2, 3 and 4 are clamped against the supporting member 22 where dowel pins 48 enter holes or recesses in the parts 3 and 4 and hold them in adjusted position. The angles 5 and 6 are then placed against the ends of the rail sections 1 and 2 and clamped in place by means of the clamping means previously described.

The work holder is then tilted and latched in the "A" position shown in Fig. 3 and the extension nozzles 17 and 18 bent down into the position there shown. The automatic welding operation is then done with the welding heads moving from one another and the center of the tie towards the ends of the tie. When the welds on one side of the plates 3 and 4 are completed, the holder is tilted to the position "B" and the welds on the other side of plates 3 and 4 then made with the welding heads moving towards each other. By welding in this manner it will be noted that the extension nozzles 17 and 18 will clear the supporting member 22 previous to tilting the work holder and that it will be unnecessary to bend them up out of the way.

While the automatic welding operation is being performed the operator of the machine may weld the angles 5 and 6 to the ends of the rail sections, either welding with the ordinary hand tool or with semi-automatic welding equipment wherein automatic means are provided for feeding the weld rod through a hand tool to supply welding material to the weld.

After the welding operation is completed the extension nozzles 17 and 18 which are now to one side of the supporting member 22 are bent up out of the way and the work holder 7 turned back to its position shown in Figs. 1 and 2. The tie is then released by deenergizing the fluid motors 40 and the finished tie is removed from the machine toward the left on the conveyor 21 on to another conveyor located to the left of the machine and not shown in the drawing. The sloping surfaces of the spacing members 31 prevent the angle 6 attached to the left bottom ends of the rails 1 and 2 from catching on them, since when these angle plates engage the sloping surface of the spacing members they are forced below the surface of the rolls on the conveyor 21 thus allowing an unobstructed passage of the finished tie from the machine. After the angle 6 has passed over the spacing members 31 they again return to their operating position by reason of springs 32 associated with them.

The welds on the second tie are made in the reverse order from that just described. That is, the welding starts from the near side on the second tie, where the first welds on the previous tie were started on the far side. This avoids unnecessary movement of the welding heads and carriages.

It will be noted that by tilting the work for the welding operation a less number of welding heads are required, and that the weld metal is deposited in a groove or channel which is a desirable thing to do and an advantageous method of welding.

In the welding machine shown in Figs. 4 to 10 all the welding operations are performed automatically. In the part of the machine shown in Figs. 4 and 5 the tie plates are welded to one side of the longitudinal members of the tie and in the part of the machine shown in Figs. 9 and 10 cross pieces or braces are welded to the other side of the longitudinal members. The part of the machine shown in Figs. 6, 7 and 8 is used to transport the work from the first part of the machine to the second part of the machine. This part is also used to turn the work over after it leaves one part of the machine so that it will be in proper position for the welding operation to be performed in the second part of the machine.

In Figs. 4 and 5 the parts necessary for forming the tie are clamped in proper relative position against a supporting member 53 forming a part of the welding machine. The longitudinal members 1 and 2 of the tie upon being inserted into the machine are initially supported by a roller conveyor 54. Spacers 55 are provided on the conveyor for locating the parts 1 and 2 relative to each other. The parts 1 and 2 are spring thrust against these spacers 55 by centering shoes 56. A stop 57 is provided to the left of the conveyor for locating the members 1 and 2 on the conveyor 54 relative to the supporting member 53.

The tie plates 3 and 4 are temporarily held in place on the supporting member 53 by spring clips 58 on dowels 59. Thereafter the parts are clamped against the supporting member by fluid devices 60 which act independently of each other through plungers 61 on the work parts 1 and 2 and lift them from the conveyor 54 and force them against the tie plates 3 and 4 and the supporting member 53 where they are held in proper relationship for the welding operation.

The welding operation is performed in this part of the machine by four welding heads 62, two of which are supported in spaced relationship to each other on a horizontal arm 63 mounted on each of two carriages *64* and *65*, in such a manner as to weld simultaneously the outside edges of the tie plates 3 and 4 to the longitudinal members 1 and 2. The welding head 62 on each carriage may be adjusted relative to each other along the arm 63 in which they are supported to accommodate different widths of tie plates. The carriages *64* and *65* are propelled along a track 66 forming a part of the machine by traversing motors 67. In the illustrated embodiment these carriages also support reels of weld rod 68.

The part of the machine shown in Figs. 6, 7 and 8 consists of two sets of roller conveyors 69 and 70 mounted between two plates 71 and 72 which in turn are attached to two discs 73 and 74 which are supported on idler rolls 75.

The conveyors 69 and 70 are spaced from one another the depth of the tie plus the thickness of the tie plates and this second part of the machine is so located with respect to the part described in Figs. 4 and 5 that the tie after the welding operation has been performed in that part of the machine may be rolled into that part shown in Figs. 6, 7 and 8 where it is turned over before being introduced into that part of the machine shown in Figs. 9 and 10.

The tie is supported in the part of the machine shown in Figs. 9 and 10 on a roller conveyor 76 and angle pieces 5 and 6 are laid over the ends of the tie and welded in place by welding heads 77. These heads are supported by carriages 78, similar to those shown in Figs. 4 and 5, that travel across the tie on tracks 79. The angles 5 and 6 may be clamped in place by any suitable means, for example such as shown in Figs. 1, 2 and 3. As illustrated in Figs. 9 and 10, however, they are retained in position solely by means of gravity.

The operation of this machine is as follows: The tie plates 3 and 4 are first placed beneath the rigid beam 53 so that the dowels 50 fit into the holes in the tie plates. These plates are temporarily held in place by the spring clips 58. The longitudinal members of the tie 1 and 2 are then placed in the conveyor 54 and adjusted relative to member 53 by stop 57 and relative to each other by spacers 55 and centering shoes 56. The fluid devices 60 are then operated to force the longitudinal members of the tie against the tie plates 3 and 4. The tie plates 3 and 4 are then welded to the members 1 and 2 by the welding heads 62.

The fluid devices 60 are then de-energized allowing the longitudinal tie members and the affixed tie plates to return to the conveyor 54 from which it is pushed onto either conveyor 69 or 70 of the part of the machine shown in Figs. 6, 7 and 8. In this part of the machine the tie is turned over by rotating the framework previously described and then moved onto the conveyor 76 of that part of the machine shown in Figs. 9 and 10. Here the heads 77 are used to weld the angles 5 and 6 to the ends of the tie. The finished tie is then removed from the machine.

It will be apparent to those skilled in the art that modifications may be made in the particular engagements described and that certain parts of the machines described may be used for hand or semi-automatic welding without departing from my invention. I therefore aim in the appended claims to cover all such changes and variations as fall within the true spirit and scope of my invention.

What I claim as new and desire to secure by Letters Patent of the United States, is:—

1. Welding apparatus comprising a cradle member having located therein a work conveyor and means for holding thereon in adjusted relationship a plurality of parts constituting the work, and rocker means for supporting said cradle member.

2. Apparatus for welding comprising a conveyor, means for locating the work to be welded on said conveyor, a member within which said conveyor is located and means for rotatably supporting said member.

3. Apparatus for welding comprising a conveyor, means for locating the work to be welded on said conveyor, a plurality of circular members within which said conveyor is located, and a plurality of rollers for rotatably supporting said circular members.

4. Welding apparatus comprising a cradle member having means for holding therein a plurality of work parts in adjusted relationship, a plurality of curved members for supporting said cradle member and a plurality of rollers against which said curved members rest.

5. Welding apparatus comprising a cradle member in which is located a work conveyor, means for holding the work parts in adjusted relationship on said conveyor, a work holding member located opposite said conveyor, and means for lifting the work parts from said conveyor and clamping them in adjusted relationship against said holding member and rocker means for supporting said cradle member.

6. Arc welding apparatus comprising a welding head arranged to feed a welding electrode to the work, a work holder, a plurality of members within which said work holder is located, and roller means coacting with said members for rotatably supporting said work holder relative to the welding head.

7. An arc welding apparatus comprising a welding head arranged to feed a welding electrode to the work, means for supporting said welding head for line welding, a work holding member, means for clamping the work parts in adjusted relationship against said member, and means for rotatably supporting said work holding member and said last mentioned means about an axis parallel to the line of welding.

8. In a welding machine, a work holder, means for clamping the work parts in adjusted relationship in said work holder, means comprising a plurality of curved members forming a part of said work holder, and a plurality of idler rollers against which said curved members rest for rotatably supporting said work holder in adjusted relation in the machine.

9. In a welding machine, a work holder comprising a conveyor, means at one end of said conveyor for locating a plurality of work pieces on said conveyor, spacing means on said conveyor for positioning the work parts on said conveyor relative to each other, a holding member opposite said conveyor, work positioning means on said holding member for locating a work piece relative to the work pieces on said conveyor, means for clamping the work pieces against said holding member, a plurality of curved members for supporting said conveyor and said holding member, said curved members having openings through which the work is introduced into the work holder, a plurality of rollers for supporting said curved members, and latch means for holding said work holder in adjusted position in said machine.

10. In a welding machine, a work holder comprising a conveyor, means at one end of said conveyor for locating a plurality of work pieces on said conveyor, spacing members having a tapered surface spring pressed above the surface of said conveyor for locating said work pieces on said conveyor relative to each other, a holding member, means on said holding member for locating a work piece relative to the work pieces on said conveyor, means for clamping the work parts against the holding member, ring members for supporting the parts of said work holder, and a plurality of idler rolls for supporting said work holder through the agency of said ring members whereby said work holder may be rotated in the machine.

11. In a welding machine, a work holder comprising a conveyor, means at one end of said conveyor for locating a plurality of work pieces on said conveyor, spacing members having a tapered surface spring pressed above the surfaces of said conveyor for locating said work pieces on said conveyor relative to each other, a holding member, means on said holding member for locating a work piece relative to the work pieces on the conveyor, means for clamping the work pieces against said holding member, means at the end of said conveyor for holding another work piece against the end of the assembled structure clamped against said holding member, ring members for supporting the parts of said work holder, and a plurality of idler rolls for supporting said work holder through the agency of said ring members whereby said work holder may be rotated in the machine.

12. In a welding machine, a work holder comprising a supporting member, adjustable dowel pins on said member, and means for locating a work piece provided with openings in said work holder so that the dowel pins match with the openings in the work piece.

13. In a welding machine, a work holder comprising a supporting member, an adjustable dowel pin on said member an adjustable work positioning means on said member, movably supported by said member and capable of extending beyond said dowel pin for engaging the work and locating it relatively to another work piece in said holder with the dowel pin directly over a hole in said work piece, means for clamping the parts against said supporting member with the dowel pin holding said parts in adjusted relationship, and latch means for holding the work positioning means in its retracted position so that the fabricated member may be freely removed from the work holder when the clamping means is released.

In witness whereof, I have hereunto set my hand this 29th day of July, 1927.

VERNI J. CHAPMAN.